US006300980B1

(12) United States Patent
McGraw et al.

(10) Patent No.: US 6,300,980 B1
(45) Date of Patent: *Oct. 9, 2001

(54) COMPUTER SYSTEM DESIGN FOR DISTANCE VIEWING OF INFORMATION AND MEDIA AND EXTENSIONS TO DISPLAY DATA CHANNEL FOR CONTROL PANEL INTERFACE

(75) Inventors: Montgomery C. McGraw, Spring; Ralph K. Williamson, Plano; Elizabeth A. Richard, Cypress; Drew S. Johnson, Houston; Christopher D. Voltz, Houston; John C. Barker, Houston; Kevin J. Brusky, Magnolia, all of TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/803,185

(22) Filed: Feb. 19, 1997

(51) Int. Cl.⁷ .................................................. H04N 11/00

(52) U.S. Cl. .................... 348/552; 348/554; 348/555; 348/553; 348/180

(58) Field of Search ............................. 348/552, 10, 345; 348/377, 328, 734, 553, 554, 555, 180, 190; 455/6.2, 6.3; H04N 11/00

(56) References Cited

U.S. PATENT DOCUMENTS

| | | | |
|---|---|---|---|
| 4,081,753 | * 3/1978 | Miller | 455/158.2 |
| 4,567,512 | * 1/1986 | Abraham | 348/7 |
| 4,658,247 | 4/1987 | Gharachorloo | 340/747 |
| 4,954,819 | 9/1990 | Watkins | 340/721 |
| 4,956,707 | * 9/1990 | Oakley et al. | 348/441 |
| 5,185,603 | * 2/1993 | Medin | 348/510 |
| 5,262,759 | * 11/1993 | Moriconi et al. | 345/30 |
| 5,291,275 | 3/1994 | Lumelsky | 348/441 |
| 5,448,697 | 9/1995 | Parks et al. | 395/162 |
| 5,451,981 | 9/1995 | Drako et al. | 345/118 |
| 5,457,473 | * 10/1995 | Arai et al. | 348/473 |
| 5,488,393 | 1/1996 | Wood et al. | 345/213 |
| 5,493,317 | * 2/1996 | Kim | 348/555 |
| 5,502,462 | 3/1996 | Mical et al. | 345/185 |

(List continued on next page.)

OTHER PUBLICATIONS

Gateway 2000 Inc. *Gateway 2000 launches Destination™ big screen PC featuring 31–inch monitor*, 1996, pp. 1–5.
Gateway 2000 Inc., *Gateway 2000 Sells Destination™ big screen PC through retail chains*, 1996, pp. 1–4.
Ziff–Davis Publishing Company, *The Big–Tube PCTV*, May 28, 1996, pp. 1–3.
Gateway 2000 Inc., *Destination Features*, 1996, pp. 1–5.
*Telefuzion*, 1997, pp. 1–2.
USA Today, *Now you can tune your TV to Internet*, 1996, pp. 1–2.
Display Data Channel Standard; VESA Video Electronic Standards Association; 1996, DDC vers.2, rev. 1; pp. 1–36.

Primary Examiner—Reinhard J. Eisenzopf
Assistant Examiner—Linus M. Lo
(74) Attorney, Agent, or Firm—Akin, Gump, Strauss, Hauer & Feld, LLP (57) ABSTRACT

A computer system provides a communication link to a display monitor so as to control the display of not only computer signals but of other signals such as television signals. By providing this link the additional power of the computer can be used to provide a storage of preferred settings for the television/display monitor depending upon signal sources, time of day or the like. This provides a more versatile display. Further data contained within a received data stream such as from a web page or the like may inherently control functions of the television display.

22 Claims, 1 Drawing Sheet

U.S. PATENT DOCUMENTS

| | | | |
|---|---|---|---|
| 5,525,858 | * 6/1996 | Berton et al. | 313/402 |
| 5,543,857 | * 8/1996 | Wehmeyer et al. | 348/589 |
| 5,544,315 | * 8/1996 | Lehfeldt et al. | 348/552 |
| 5,563,665 | * 10/1996 | Chang | 348/552 |
| 5,610,663 | 3/1997 | Nan et al. | 348/554 |
| 5,621,473 | * 4/1997 | Hill | 348/559 |
| 5,675,390 | * 10/1997 | Schindler et al. | 348/552 |
| 5,703,657 | * 12/1997 | Maruoka et al. | 348/554 |
| 5,706,451 | * 1/1998 | Lightbody et al. | 348/552 |
| 5,721,593 | * 2/1998 | Suh | 348/563 |
| 5,736,971 | * 4/1998 | Shirai | 348/555 |
| 5,751,374 | * 5/1998 | Ninomiya et al. | 348/571 |
| 5,760,838 | * 6/1998 | Adams et al. | 348/460 |
| 5,787,259 | * 7/1998 | Haroun et al. | 395/200.83 |
| 5,819,156 | * 10/1998 | Belmont | 455/2 |
| 5,926,228 | * 7/1999 | Jeon et al. | 348/554 |

* cited by examiner

FIG. 1

COMPUTER SYSTEM DESIGN FOR DISTANCE VIEWING OF INFORMATION AND MEDIA AND EXTENSIONS TO DISPLAY DATA CHANNEL FOR CONTROL PANEL INTERFACE

BACKGROUND OF THE INVENTION

1. Technical Field of the Invention

This invention relates to a novel display system and methodology for providing for the display of information from computers and more particularly to a "large screen" type of computer monitor for display of computer information and of other types of media.

2. Description of Related Art

Various computer monitors are available for the display of computer information on a "large screen" type of computer display. These types of displays are suitable for viewing at a distance, however, are ill suited for the display of mixed media such as a regular TV broadcast and computer information on the same screen. They are further not suited for a rapid switching between media such as these two types of media. This invention provides a unique mechanism by which a standard computer can control various functions of the display screen and to store and transmit parameters from the computer to the display monitor so as to provide a more advantageous display of multi-media content and the like. This invention also provides a display screen capable of "distance" viewing for a computer.

SUMMARY OF THE INVENTION

A computer controlled monitor is provided which allows for the display of video signals which may be produced by a variety and multiplicity of sources. These sources can be acquired or produced either digitally by the computer processing unit or an analog signal received from multiple sources. The computer can interpret, process and control the playback of these signals which are to be displayed. The "overscan" and "underscan" of the display can be changed using a software control which can be either automatic or manual and which may be in response to the type of material to be displayed and its source. Alternatively, or in combination, video images can be generated or acquired by the computer itself and signals can be combined. Examples of the type of broadcast types signals sources are conventional TV transmission, analog cable transmission, digital data broadcast such as direct satellite TV or digital broadcast which is carried as part of an analog broadcast television signal. Additional information that can be displayed may come from the VBI or vertical blanking interval or other parts of the analog video wave form Also digital data received by a cable modem, telephone modems, ISDN, transmission of multi-media sources, wireless or the like, can also be displayed. Additionally, by providing a mechanism in the computer for maintaining and transmitting to the monitor various types of extended display identification data. This data can be used to set or control the display on the monitor, be it a large screen or a small screen. This provides an enhanced capability. Further a host computer sending information can send along with the information to be displayed information as to how the monitor or display should be adjusted, providing a far more user friendly device.

One of the objects of this invention is to provide a computer controlled monitor which may be of the large screen type with a mechanism by which a computer can provide controls as to the various image set-ups that are necessary as well as possible audio controls and standard monitor controls such as degaussing alignment or the like.

An additional advantage of this invention is the ability to "mix and match" various video sources under the control of what can basically be a standard personal computer thereby increasing the flexibility of personal computers.

BRIEF DESCRIPTION OF THE DRAWINGS

Other advantages and novel features of the present invention will become apparent from the following detailed description of the invention when considered in conjunction with the accompanying drawings in which like numerals designate like items and in which.

DETAILED DESCRIPTION OF THE DRAWINGS

Figure 1:
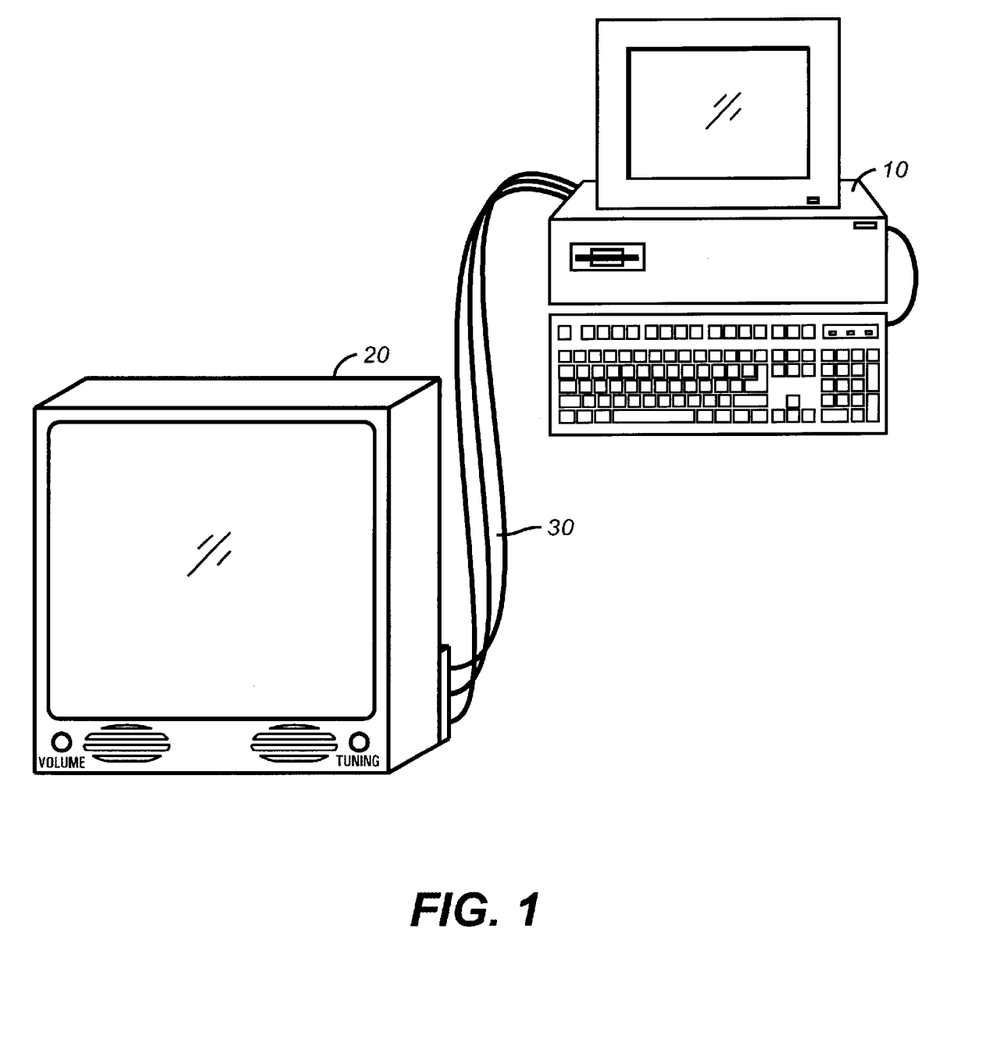
FIG. 1 is a basic block diagram of the system of this invention showing the interconnection between the monitor and a standardized bus contained within the computer.

As can be seen from FIG. 1 a conventional computer system 10 using, for example, a PCI bus is provided with an $I^2C$ interface connecting the computer PCI bus to a monitor 20. This communication which can use, for example, an $I^2C$ communication 30 methodology to talk from the computer to the monitor and vice versa. It should be noted that although this embodiment shows an $I^2C$ communication link 30 between the monitor and the computer and a specific type of bus in the computer (i.e. a PCI bus) it will be readily apparent to one of ordinary skill in the art that the PCI bus could be replaced with items such as a VESA bus, a VLB bus, or the like and the communication system to the monitor may be less or more sophisticated, for example, an RS 232 type of communication link, an IEEE1394, a Universal Serial Bus (USB), Ethernet® or the like might be employed. Other types of digital communication links between the monitor and the bus of the personal computer are in fact contemplated by this invention.

The $I^2C$ communication system, however, lends itself particularly to this type of task as it requires only minimal connections from the computer to the monitor (SCL and SDA (clock and data)). Furthermore, as the protocols involved and $I^2C$ have been established by standard, it is possible to use a standard off the shelf type of controller in the computer and a receiver in the monitor to implement this type of system. It will be readily understood by one of ordinary skill in the art how to implement the hardware portion of this communication and one needs only to look to the Philips $I^2C$ specification for guidance as to an implementation of this embodiment. The $I^2C$ communication between the computer and the monitor can be implemented using a very simple user interface as is set forth herein, by using for example below software protocol.

DDC2B-CPI COMMAND OVERVIEW
DDC2B-CPI Command Syntax
Notation

The following notational conventions are used throughout this document:

---

| | |
|---|---|
| s | $I^2C$ start condition. Initiated by the master. |
| p | $I^2C$ stop condition. Initiated by the master |
| SWA | $I^2C$ slave write address. This is the 7 bit slave address plus a 0b to signify a write. Typically, this would be AOh, but could be A2h, A4h, . . . See the attached appendix from Video Electronics Standards Association dated October 15th, 1995 and |

-continued

| | |
|---|---|
| | which is incorporated by reference herein for a description of a VESA display data channel protocol and connections (DDC V2p). |
| SRA | I²C slave read address. This is the 7 bit slave address plus a 1b to signify a read Typically, this would be A1h, but could be A3h, A5h, . . . See the VESA DDC V2p for details. |
| a | I²C acknowledge - single bit, active high. Could be initiated by the master or by the slave. |
| n | I²C negative acknowledge - single bit, active low. Initiated by the master. |
| ( ) | Data bits driven onto the I²C bus by the master device. |
| { } | Data bits driven onto the I²C bus by the slave device. |
| POC | Primary opcode -- this can be considered as an I²C index offset. |
| SOB | Start-of-block -- the index at which the CPI EDID extension block begins. Typically, this would be 80h, but it could also be 00h. |
| RO | Read-only -- indicates that the location cannot be written to. |
| WO | Write-only -- indicates that the location can only be written to; no useful value can be read. |
| RW | Read or Write -- indicates that the location can either be written to or read from. |

Read Commands

The DDC2B-CPI read command takes the following form:

s (SWA) {a} (POC+SOB) {a} s (SRA) {a} {data} (a) (data) . . . (n) p

Write Commands

The DDC2B-CPI write command takes the following form:

s (SWA) {a} (POC+SOB) {a} (data) {a} p

DDC2B-CPI Command Set

The following table shows the primary opcode (POC) for each control panel interface command.

TABLE 1

DDC2B-CPI command set.

| POC | COMMAND | R/W | DESCRIPTION/VALUE |
|---|---|---|---|
| 00h | DDC2B-CPI ID | RO | 24h |
| 01h | DDC2B-CPI ID | RO | 0Eh |
| 02h | DDC2B-CPI ID | RO | 11h |
| 03h | DDC2B-CPI REV | RO | 00h - Revision 0 of DDC2B-CPI |
| 08h | Save current settings | WO | Save current settings in non-volatile memory. Monitor will default to these settings on next power up. |
| 09h | Return precision | RO | Returns precision of the last value read or written via the CPI. Precision bits = 1. |
| 10h | System Commands | WO | <0> Restore all defaults<br><1> Restore geometry<br><2> Restore picture qualities (brightness, contrast)<br><3> Degauss<br><4> RESERVED = 0<br><5> RESERVED = 0 |

TABLE 1-continued

DDC2B-CPI command set.

| POC | COMMAND | R/W | DESCRIPTION/VALUE |
|---|---|---|---|
| | | | <6> RESERVED = 0<br><7> RESERVED = 0 |
| 13h | CPI caps1 | RO | <0> Brightness<br><1> Contrast<br><2> Color temperature<br><3> Vertical position<br><4> Vertical size<br><5> Vertical pincushion<br><6> Horizontal position<br><7> Horizontal size |
| 14h | CPI caps2 | RO | <0> Overscan<br><1> Tilt control<br><2> Volume<br><3> Balance<br><4> Mute<br><5> RESERVED = 0<br><6> RESERVED = 0<br><7> RESERVED = 0 |
| 15h | CPI caps3 | RO | <7..0> RESERVED = 0 |
| 16h | CPI caps4 | RO | <7..0> RESERVED = 0 |
| 17h | Remote control ID | RO | 00h |
| 20h | Brightness | RW | Increasing this value increases display luminance. Unipolar setting: 00h=min; FFh=max. |
| 21h | Contrast | RW | Increasing this value increases the ratio between the maximum and minimum luminance values. Unipolar setting: 00h=min; FFh=max. |
| 22h | Picture qualities flags | RW | <1,0> Color temperature<br>00 = 6500 Kelvin<br>01 = 8000 Kelvin<br>10 = 9300 Kelvin<br>11 = RESERVED<br><7. .2> RESERVED = 0 |
| 23h | Color Purity | RW | This control is set according to the direction the monitor is facing to remove color impuritys from the displayed image due to the earth's magnetic field. Increasing this value changes the direction from North to South. Bipolar setting: 00h=North; 80h=Neutral (default factory setting); FFh=South. |
| 30h | Vertical Position | RW | Increasing this value moves the image toward the top of the display.<br>Bipolar setting (00h=max down; 80h=centered (default factory setting); FFh=max up. |
| 31h | Vertical Size | RW | Increasing this value increases the distance between the top and bottom of the image.<br>Bipolar setting: 00h=min size; 80h=centered (default factory setting); FFh=max size. |
| 32h | Vertical Pincushion | RW | Increasing this value causes the left and right sides of the image to become more convex.<br>Bipolar setting: 00h=max concave; 80h=centered (default factory setting); FFh=max convex. |
| 33h | Horizontal Position | RW | Increasing this value moves the image toward the right side of the display.<br>Bipolar setting: 00h=max left; 80h=centered (default factory setting); FFh=max right. |
| 34h | Horizontal Size | RW | Increasing this values increases the distance between the left and right sides of the image.<br>Bipolar setting: 00h=min size; 80h=centered (default factory setting); FFh=max size. |

TABLE 1-continued

DDC2B-CPI command set.

| POC | COMMAND | R/W | DESCRIPTION/VALUE |
|---|---|---|---|
| 35h | Geometry flags | RW | <0> 1 = overscan mode. (Video overscans display by 10%.) 0 = underscan mode. (the default) <7..1> RESERVED = 0 |
| 36h | Tilt control | RW | Increasing this value rotates the image in a clockwise direction. Bipolar setting: 00h=max counter clockwise; 80h = no tilt (default factory setting); FFh=max clockwise. |
| 40h | Volume | RW | Increasing this value causes the volume in the left and right audio channels to increase. Unipolar setting: 00h=mute; FFh= max volume. |
| 41h | Balance | RW | Increasing this value maximizes the volume in the right audio channel and the volume in the left audio channel is decreased. Bipolar setting: 00h=max left channel, min right channel; 80h=equal left and right channels; FFh=min left channel, max right channel. |
| 42h | Audio Flags | RW | <0> 1 = audio muted 0 = audio not muted <7..1> RESERVED = 0 All locations not specified are RESERVED=00h |

IDENTIFICATION OF DDC2B-CPI MONITOR

EDID Extension Flag

The I²C address and index space necessary to provide the CPI capabilities is implemented as a standard EDID extension. Offset 7Eh of the primary EDID indicates the number of 128 byte EDID extension blocks. On a DDC2B-CPI monitor, this value will indicate that there is at least one additional EDID extension block. Before reading offset 7Eh, the host should perform the standard procedure for positive identification of a DDC2B monitor. See the VESA DDC specification for information on how to do this.

DDC2B-CPI Signature/rev

The first four locations of the EDID extension for CPI support will have the following signature: 24h, 0Eh, 11h, 00h. These bytes should be read consecutively as in the example below.

EXAMPLE 1

Reading the DDC2B-CPI Signature/rev.

Assuming that location 7Eh of the primary EDID indicates that there is one extended EDID block, the following I²C bus transaction should be used to identify a DDC2B-CPI monitor:

s (A0h) {a} (80h) {a} s (A1h) {a} {24h} (a) {0Eh} (a) {11h} (a) {00h} (n) p

The first EDID extension block will be at I²C address A0h, offset 80h. The next EDID extension block will be at I²C address A2h, offset 00h. The next EDID extension will be at I²C address A2h, offset 80h, and so on. If there is more than one EDID extension, each EDID extension block should be checked for the above signature. The address and offset at which the signature are found establish slave read address (SRA), slave write address (SWA), and start-of-block (SOB) for the control panel interface. Consider the example below in which the CPI is located in the second extension block.

EXAMPLE 2

Reading the DDC2B-CPI Signature/rev in Second EDID Extension Block.

Assume that location 7Eh of the primary EDID indicates that there are two extended EDID blocks. The DDC2B-CPI signature was not found in the first EDID extension. The following I²C bus transaction should be used to identify a DDC2B-CPI monitor in the second EDID extension:

s (A2h) {a} (00h) {a} s (A3h) {a} {24h} (a) {0Eh} (a) {11h} (a) {00h} (n) p

MONITOR CONTROL COMMANDS

General Controls

Save Current Settings

This command can be used to save the current monitor settings of the current mode (overscan/underscan) in non-volatile memory. The following settings are saved for each mode:

Brightness

Contrast

Vertical image position

Vertical image size

Vertical pincushion

Horizontal image position

Horizontal image size

Color Temperature

In addition, the following settings would be saved for both modes:

Tilt

Color Purity

Volume level

Balance

The next time that the monitor is turned on, it will default to the settings last saved in non-volatile memory. The overscan/underscan mode is not maintained in non-volatile memory. The monitor will always power up in underscan mode. If there is only one EDID extension block, the command would be issued in the following way:

EXAMPLE 3

Save Current Settings.

s (A0h) {a} (88h) {a} p

Return Precision

This command can be used to identify the precision of any control setting. To use the command, first read the current value of the control, then use the precision command. The precision is returned as the smallest significant increment. Consider the example below.

EXAMPLE 4

Return Precision.

If we want to identify the precision of the monitor brightness setting, we must first read the current brightness setting:

```
s (A0h) {a} (A0h) {a} s (A1h) {a} {88h} (n) p
```

We use the precision command to identify the precision of the brightness control:

```
s (A0h) {a} (89h) {a} s (A1h) {a} {04h} (n) p
```

The return value of "04h" indicates that the smallest significant increment to the value is 0000 0100b. Bits <7 . . . 2> can be used to adjust the 64 levels of brightness. Bits <1> and <0> are not significant.

Restore Default Commands

Restore all Default Monitor Settings

This command can be used to restore all factory-default monitor settings in non-volatile memory for the current mode (overscan/underscan). The following settings are updated:
Brightness
Contrast
Vertical image position
Vertical image size
Vertical pincushion
Horizontal image position
Horizontal image size
Color Temperature
Tilt
Color Purity
Volume level
Balance The settings are only updated for the current mode. If there is only one EDID extension block, the command would be issued in the following way:

EXAMPLE 5
Restore all Default Monitor Settings.

```
s (A0h) {a} (90h) {a} (01h) {a} p
```

Restore Default Monitor Geometry Settings

This command can be used to restore the factory-default monitor geometry settings in non-volatile memory for the current mode (overscan/underscan). Only the settings of the current mode will be updated, and default values will be restored. If there is only one EDID extension block, the command would be issued in the following way:

EXAMPLE 6
Restore Default Monitor Geometry Settings.

```
s (A0h) {a} (90h) {a} (02h) {a} p
```

The geometry settings include:
Vertical image position
Vertical image size
Vertical pincushion
Horizontal image position
Horizontal image size
Overscan/underscan Restore Default Monitor Picture Qualities This command can be used to restore the factory-default monitor brightness and contrast settings in nonvolatile memory for the current mode (overscan/underscan). Only the settings of the current mode will be updated, and default values will be restored. If there is only one EDID extension block, the command would be issued in the following way:

EXAMPLE 7
Restore Default Picture Qualities.

```
s (A0h) {a} (90h) {a} (04h) {a} p
```

The picture qualities include:
Brightness
Contrast

Degauss

This command can be used to activate the degauss cycle. This cycle will ideally be automatically activated by the monitor electronics each time the monitor leaves the standby state. This command could provide a method of manually activating the degauss cycle. If there is only one EDID extension blocks the command would be issued in the following way:

EXAMPLE 8
Activate Degauss Cycle.

```
s (A0h) {a} (90h) {a} (08h) {a} p
```

CPI capabilities
CPI caps1, caps2, caps3, caps4

These commands can be used to obtain the control panel interface capabilities. If there is only one EDID extension block, the command would be issued in the following way:

EXAMPLE 9
Read CPI Capabilities.

```
READ:
s (A0h) {a} (93h) {a} s (A1h) {a} {capabilities} (n) p
s (A0h) {a} (94h) {a} s (A1h) {a} {capabilities} (n) p
s (A0h) {a} (95h) {a} s (A1h) {a} {capabilities} (n) p
s (A0h) {a} (96h) {a} s (A1h) {a} {capabilities} (n) p
```

Remote Control ID

These commands can be used to identify the remote control interface. If there is only one EDID extension block, the command would be issued in the following way:

EXAMPLE 10
Remote Control ID.

---
READ:
s (A0h) {a} (97h) {a} s (A1h) {a} {remote control ID}
(n) p

---

Picture Qualities Commands
Read/write Brightness Setting

This command could be used to either read or write the brightness setting in the monitor. Increasing this value will increase the display luminance. The brightness setting for underscan mode is independent of the brightness setting for overscan mode. If there is only one EDID extension block, the command would be issued in the following way:

EXAMPLE 11
Read/write Brightness Setting.

---
READ:
s (A0h) {a} (A0h) {a} s (A1h) {a} {brightness setting}
(n) p
WRITE:
s (A0h) {a} (A0h) {a} (new brightness setting) {a} p

---

The precision for each monitor control may vary. Software should use the precision command to identify the precision available for each control. See Example 5–2. In each case, the most significant bit of the control is bit <7> of the value. If, for example, the monitor only support 64 levels, the monitor would use the 6 most significant bits of the value written. Example 5–10 shows how this would work. This provides a more compatible expansion of precision in the future. Bits that are not supported should return 0 when read.

EXAMPLE 12
Monitor Supports Fewer than 256 Levels of Brightness.
Host tries to write a value of B5h:

---
s (A0h) {a} (A0h) {a} (1011 0101b) {a} p

---

Actual monitor setting=1011 0101b shift right 2=101101b

Read/write Contrast Setting

This command can be used to either read or write the contrast setting in the monitor. Increasing this value will increase the ratio between maximum and minimum luminance. The contrast setting for underscan mode is independent of the contrast setting for overscan mode. If there is only one EDID extension block, the command would be issued in the following way:

EXAMPLE 13
Read/write Contrast Setting

---
READ:
s (A0h) {a} (A1h) {a} s (A1h) {a} {contrast setting}
(n) p
WRITE:
s (A0h) {a} (A1h) {a} (new contrast setting) {a} p

---

The precision for each monitor control may vary. Software should use the precision command to identify the precision available for each control. See Example 4. In each case, the most significant bit of the control is bit <7> of the value. If, for example, the monitor only support 64 levels, the monitor would use the 6 most significant bits of the value written. Example 12 shows how this would work. This provides a more compatible expansion of precision in the future. Bits that are not supported should return 0 when read.

Read/write Color Temperature Setting

This command can be used to either read or write the color temperature setting in the monitor. Care should be taken in writing this value since other bits in the value are currently undefined. It is best to do a read/modify/write of the value—changing only bits <1, 0>. If there is only one EDID extension block, the command would be issued in the following way:

EXAMPLE 14
Read/write Color Temperature Setting.

---
READ:
s (A0h) {a} (A2h) {a} s (A1h) {a} {color temperature setting} (n) p
WRITE:
s (A0h) {a} (A2h) {a} (new color temperature setting) {a} p

---

Read/write Color Purity Setting

This command can be used to either read or write the color purity setting in the monitor. This command will not be a user control. If there is only one EDID extension block, the command would be issued in the following way:

EXAMPLE 15
Read/write Color Purity Setting.

---
READ:
s (A0h) {a} (A3h) {a} s (A1h) {a} {color purity setting} (n) p
WRITE
s (A0h) {a} (A3h) {a} (new color purity setting) {a} p

---

The precision for each monitor control may vary. Software should use the precision command to identify the precision available for each control. See Example 5–2. In each case, the most significant bit of the control is bit <7> of the value. If, for example, the monitor only support 64 levels, the monitor would use the 6 most significant bits of the value written. Example 12 shows how this would work. This provides a more compatible expansion of precision in the future. Bits that are not supported should return 0 when read.

Geometry Commands
Read/write Vertical Position Setting

This command can be used to either read or write the vertical position setting in the monitor. Increasing this value will move the displayed image toward the top of the screen. Decreasing this value will move the displayed image toward the bottom of the screen. The vertical position command for underscan mode is independent of the setting for overscan mode. If there is only one EDID extension block, the command would be issued in the following way:

EXAMPLE 16
Read/write Vertical Position Setting.

```
READ:
s (A0h) {a} (B0h) {a} s (A1h) {a} {vertical position
setting} (n) p
WRITE:
s (A0h) {a} (B0h) {a} (new vertical position setting)
{a} p
```

The precision for each monitor control may vary. Software should use the precision command to identify the precision available for each control. See Example 5–2. In each case, the most significant bit of the control is bit <7> of the value. If, for example, the monitor only support 64 levels, the monitor would use the 6 most significant bits of the value written Example 12 shows how this would work. This provides a more compatible expansion of precision in the future. Bits that are not supported should return 0 when read.

Read/write Vertical Size Setting

This command can be used to either read or write the vertical size setting in the monitor. Increasing this value will increase the distance between the top and bottom of the displayed image. (The image will be bigger.) The vertical size setting for underscan mode is independent of the setting for overscan mode. If there is only one EDID extension block, the command would be issued in the following way:

EXAMPLE 17
Read/write Vertical Size Setting.

```
READ:
s (A0h) {a} (B1h) {a} s (A1h) {a} {vertical size
setting} (n) p
WRITE:
s (A0h) {a} (B1h) {a} (new vertical size setting) {a}
p
```

The precision for each monitor control may vary. Software should use the precision command to identify the precision available for each control See Example 4. In each case, the most significant bit of the control is bit <7> of the value. If, for example, the monitor only support 64 levels, the monitor would use the 6 most significant bits of the value written. Example 12 shows how this would work. This provides a more compatible expansion of precision in the future. Bits that are not supported should return 0 when read.

Read/write Vertical Pincushion Setting

This command can be used to either read or write the vertical pincushion setting in the monitor. Increasing this value will make the left and right sides of the image more convex. The vertical pincushion setting for underscan mode is independent of the setting for overscan mode. If there is only one EDID extension block, the command would be issued in the following way:

EXAMPLE 18
Read/write Vertical Pincushion Setting.

```
READ
s (A0h) {a} (B2h) {a} s (A1h) {a} {vertical pincushion
setting} (n) p
WRITE:
s (A0h) {a} (B2h) {a} (new vertical pincushion
setting) {a} p
```

The precision for each monitor control may vary. Software should use the precision command to identify the precision available for each control. See Example 4. In each case, the most significant bit of the control is bit <7> of the value. If, for example the monitor only support 64 levels, the monitor would use the 6 most significant bits of the value written. Example 12 shows how this would work. This provides a more compatible expansion of precision in the future. Bits that are not supported should return 0 when read.

Read/write Horizontal Position Setting

This command can be used to either read or write the horizontal position setting in the monitor. Increasing this value will move the displayed image toward the right side of the screen. The horizontal position setting for underscan mode is independent of the setting for overscan mode. If there is only one EDID extension block, the command would be issued in the following way:

EXAMPLE 19
Read/write Horizontal Position Setting.

```
READ:
s (A0h) {a} (B3h) {a} s (A1h) {a} {horizontal position
setting} (n) p
WRITE:
s (A0h) {a} (B3h) {a} (new horizontal position
setting) {a} p
```

The precision for each monitor control may vary. Software should use the precision command to identify the precision available for each control, See Example 4. In each case, the most significant bit of the control is bit <7> of the value. If, for example, the monitor only support 64 levels, the monitor would use the 6 most significant bits of the value written. Example 12 shows how this would work. This provides a more compatible expansion of precision in the future. Bits that are not supported should return 0 when read.

Read/write horizontal size setting

This command can be used to either read or write the horizontal size setting in the monitor. Increasing this value will increase the distance between the left and right sides of the displayed image. (The image will be bigger.) The horizontal size setting for underscan mode is independent of the setting for overscan mode. If there is only one EDID extension block, the command would be issued in the following way:

EXAMPLE 20
Read/write Horizontal Size Setting.

```
READ:
s (A0h) {a} (B4h) {a} s (A1h) {a} {horizontal size
setting} (n) p
WRITE:
s (A0h) {a} (B4h) {a} (new horizontal size setting)
{a} p
```

The precision for each monitor control may vary. Software should use the precision command to identify the precision available for each control. See Example 4. In each case, the most significant bit of the control is bit <7> of the value. If, for example, the monitor only support 64 levels, the monitor would use the 6 most significant bits of the value written. Example 12 shows how this would work. This provides a more compatible expansion of precision in the future. Bits that are not supported should return 0 when read.

Set Overscan/underscan Mode

This command can be used to either read or set the overscan mode setting in the monitor. In overscan mode, ten percent of the image is beyond the edges of the monitor bezel. In underscan mode, the entire image is visible between the edges of the monitor bezel. The monitor will always power up in underscan mode. Care should be taken in writing this value since other bits in the value are currently undefined. It is best to do a read/modify/write of the value—changing only bit <0>. If there is only one EDID extension block, the command would be issued in the following way:

EXAMPLE 21

Read/write Overscan Mode.

```
READ:
s (A0h) {a} (B5h) {a} s (A1h) {a} {overscan mode setting} (n) p
WRITE:
s (A0h) {a} (B5h) {a} (new overscan mode setting) {a} p
```

Read/write Tilt Setting

This command can be used to either read or write the tilt setting in the monitor. Increasing this value will displayed image in a clockwise direction. Decreasing this value will rotate the displayed image in a counterclockwise direction. The tilt setting for underscan mode is independent of the setting for overscan mode. If there is only one EDID extension block, the command would be issued in the following way:

EXAMPLE 22

Read/write Tilt Setting.

```
READ:
s (A0h) {a} (B6h) {a} s (A1h) {a} {tilt setting} (n)
p
WRITE:
s (A0h) {a} (B6h) {a} (new tilt setting) {a} p
```

The precision for each monitor control may vary. Software should use the precision command to identify the precision available for each control. See Example 4. In each case, the most significant bit of the control is bit <7> of the value. If, for example, the monitor only support 64 levels, the monitor would use the 6 most significant bits of the value written. Example 12 shows how this would work. This provides a more compatible expansion of precision in the future. Bits that are not supported should return 0 when read.

Audio Commands

Read/write Audio Volume

This command can be used to read or write the audio volume in the monitor. Increasing this value raises the audio volume level. If there is only one EDID extension block, the command would be issued in the following way:

EXAMPLE 23

Read/write Audio Volume.

```
READ:
s (A0h) {a} (C0h) {a} s (A1h) {a} {audio volume} (n)
p
WRITE:
s (A0h) {a} (C0h) {a} (new audio volume) {a} p
```

The precision for each monitor control may vary. Software should use the precision command to identify the precision available for each control. See Example 4. In each case, the most significant bit of the control is bit <7> of the value. If, for example, the monitor only support 64 levels, the monitor would use the 6 most significant bits of the value written. Example 12 shows how this would work. This provides a more compatible expansion of precision in the future. Bits that are not supported should return 0 when read.

Read/write Audio Balance

This command can be used to read or write the audio balance between the left and right audio channels in the monitor. Increasing this value maximizes the volume in the right audio channel and the volume in the left audio channel is decreased. If there is only one EDID extension block, the command would be issued in the following way:

EXAMPLE 24

Read/write Audio Balance.

```
READ:
s (A0h) {a} (C1h) {a} s (A1h) {a} {audio balance} (n)
p
WRITE:
s (A0h) {a} (C1h) {a} (new audio balance) {a} p
```

The precision for each monitor control may vary. Software should use the precision command to identify the precision available for each control. See Example 4. In each case, the most significant bit of the control is bit <7> of the value. If, for example, the monitor only support 64 levels, the monitor would use the 6 most significant bits of the value written. Example 12 shows how this would work. This provides a more compatible expansion of precision in the future. Bits that are not supported should return 0 when read.

Mute Audio

This command can be used to either read or set the audio mute control in the monitor. Care should be taken in writing this value since other bits in the value are currently undefined. It is best to do a read/modify/write of the value—changing only bit <0>. If there is only one EDID extension block, the command would be issued in the following way:

EXAMPLE 25

Read/write Audio Mute Control.

```
READ:
s (A0h) {a} (C2h) {a} s (A1h) {a} {mute control} (n)
p
WRITE:
s (A0h) {a} (C2h) {a} (new mute control) {a} p
```

The above software routines can be readily staffed or used as functional software routines to provide the necessary control to the monitor shown in FIG. 1. For example a user may store information that the brightness needs to be set to a certain level for certain types of television programs with the audio being set at a certain volume when, for example, a given channel is tuned and an entirely different set of parameters should be used when a second audio source such as a movie being played off from a digitally recorded movie or a DSS received movie as an example.

Furthermore, if multiple images are desired on the screen, it is possible by adjusting the size of one of the images being transmitted to the monitor and the size of the various images to allow the monitor to project multiple images in varying windows on the display monitor. As the computer controls the material being sent to the monitor and in fact may be generating this material, it will be readily understood by one of ordinary skill in the art that the combining of the images and the overlap can be accomplished by using standard "windowing" software techniques.

Alternatively, the combining of images can be done in hardware, however, it is believed that the personal computer has far better capabilities in combining the images than dedicated hardware. Accordingly, it is contemplated that the PC-CPU shown in FIG. 1 and the PC graphics controller will do the combining of images. However, one of ordinary skill in the art will readily understand that this could be accomplished by a separate piece of dedicated hardware.

Various other implementations of this invention are possible and the scope of this invention should not be limited to the specific embodiment set forth herein, but rather should only be limited by the claims appended hereto.

What is claimed is:

1. A method for adjusting a monitor control parameter associated with a monitor, the method comprising the steps of:

receiving a first input signal requesting to adjust the monitor control parameter;

quering the monitor for status of the monitor control parameter, the quering step further comprising the steps of:

quering the monitor to determine if the monitor is a monitor type that allows adjustment of monitor control parameters;

identifying which of the plurality of monitor control parameters is capable of adjustment;

determining a present value of the first of the plurality of monitor control parameters;

determining a precision value of the first of the plurality of monitor control parameters, thereby determining a smallest significant increment for the first of the plurality of monitor control parameters;

adjusting the monitor control parameter responsive to receiving the first input signal and according to the status of the queried monitor control parameter; and repeating the steps of receiving, quering and adjusting for a plurality of monitor control parameters.

2. The method of claim 1, wherein the step of determining a precision value of the first of the plurality of monitor control parameters includes the step of reading the precision value from a storage location.

3. The method of claim 1, further comprising the steps of:

receiving a second input signal for display on the monitor;

identifying a first of the plurality of monitor control parameters that should be altered responsive to receiving the second input signal; and adjusting the first of the plurality of monitor control parameters responsive receiving the second input signal and according to the status of the queried plurality of monitor control parameters.

4. The method of claim 3, wherein the first input signal is receivable from a first source and the second input signal is receivable from a second source.

5. The method of claim 1, wherein the first video signal and the second input signal are displayable simultaneously on the video display.

6. The method of claim 5, wherein:

the video display is partitionable into at least a first window and a second window;

the first video signal is displayable in the first window; and the second video signal is displayable in the second window.

7. The method of claim 1, wherein the first of the plurality of monitor control parameters is an overscan mode setting command.

8. The method of claim 1, wherein the first of the plurality of monitor control parameters is a brightness setting command.

9. The method of claim 1, wherein the first of the plurality of monitor control parameters is a contrast setting command.

10. The method of claim 1, wherein the first of the plurality of monitor control parameters is a geometry setting control command.

11. The method of claim 1, the adjusting step further comprising the steps of:

operating the monitor in an underscan mode; and switching the operation of the monitor from the underscan mode to an overscan mode responsive to receiving the first input signal for display on the monitor.

12. A computer system for management of a display output, the system comprising:

a monitor for displaying images received from a first input signal;

a processor coupled to the monitor, the processor at least for communicating with the monitor;

a storage device coupled to the processor, the storage device containing computer instructions which when executed by the processor perform the steps of:

quering the monitor for status of a monitor control parameter, the step of polling further comprising the steps of:

quering the monitor to determine if the monitor is a monitor type that allows adjustment of monitor control parameters;

identifying which of the plurality of monitor control parameters is capable of adjustment;

determining a present value of the first of the plurality of monitor control parameters;

determining a precision value of the first of the plurality of monitor control parameters, thereby determining a smallest significant increment for the first of the plurality of monitor control parameters;

adjusting the first of the plurality of monitor control parameters responsive receiving the first input signal and according to the status of the queried monitor control parameter; and repeating the steps of receiving, quering and adjusting for a plurality of monitor control parameters.

13. The computer system of claim 12, wherein the step of determining a precision value of the first of the plurality of monitor control parameters includes the step of reading the precision value from a storage location.

14. The computer system of claim 12, the steps executed by the processor further comprising the steps of:

receiving a second input signal for display on the monitor;

identifying a first of the plurality of monitor control parameters that should be altered responsive to receiving the second input signal; and adjusting the first of the plurality of monitor control parameters responsive receiving the second input signal and according to the status of the queried monitor control parameters.

15. The computer system of claim 14, wherein the first input signal is receivable from a first source and the second input signal is receivable from a second source.

16. The computer system of claim 12, wherein the first input signal and the second video signal are displayable simultaneously on the video display.

17. The computer system of claim 16, wherein:

the video display is partitionable into at least a first and a second window;

the first video signal is displayable in the first window; and the second video signal is displayable in the second window.

18. The computer system of claim 12, wherein the first of the plurality of monitor control parameters is an overscan mode setting command.

19. The computer system of claim 12, wherein the first of the plurality of monitor control parameters is a brightness setting command.

20. The computer system of claim 12, wherein the first of the plurality of monitor control parameters is a contrast setting command.

21. The computer system of claim 12, wherein the first of the plurality of monitor control parameters is a geometry setting control command.

22. The computer system of claim 12, the adjusting step executed by the processor further comprising the steps of:

operating the monitor in an underscan mode; and switching the operation of the monitor from the underscan mode to an overscan mode responsive to receiving the first input signal for display on the monitor.

\* \* \* \* \*

UNITED STATES PATENT AND TRADEMARK OFFICE
CERTIFICATE OF CORRECTION

PATENT NO. : 6,300,980 B1
DATED : October 9, 2001
INVENTOR(S) : Montgomery C. McCraw et al.

It is certified that error appears in the above-identified patent and that said Letters Patent is hereby corrected as shown below:

Column 16,
Lines 43, 46 and 62, delete "quering" and insert therefor -- querying --.
Line 44, delete "polling" and insert therefor -- querying --.

Signed and Sealed this

Fifteenth Day of November, 2005

JON W. DUDAS
*Director of the United States Patent and Trademark Office*